United States Patent Office 3,536,785
Patented Oct. 27, 1970

3,536,785
COLLOIDAL SILICA AS A SUSPENDING AGENT IN STYRENE POLYMERIZATION
Benjamin C. Wilbur, Philadelphia, Pa., assignor to Atlantic Richfield Company, Philadelphia, Pa., a corporation of Pennsylvania
No Drawing. Filed Aug. 2, 1967, Ser. No. 657,760
Int. Cl. C08f 7/04
U.S. Cl. 260—880          3 Claims

ABSTRACT OF THE DISCLOSURE

This invention relates to the use of colloidal silica as a suspending agent in the polymerization of styrene. The silica is first dispersed in the monomer and then this mixture is added to an aqueous phase. Preferably, colloidal silica having a particle size ranging from 0.015 micron to 0.050 micron is utilized. This invention can be employed in either styrene homopolymerization or copolymerization with other monomers or in the production of graft polymer such as those prepared by polymerizing styrene with rubber.

BACKGROUND OF INVENTION

In British Pat. No. 952,351 it is disclosed that colloidal silica alone is not a satisfactory suspending agent for styrene polymerization in an oil-in-water suspension. This patent attempts to overcome the deficiencies by the addition of an organic cationic compound which imparts both hydrophilic and organophilic properties to the silica. One disadvantage, however, in utilizing this method is that a portion of the cationic compound tends to remain with the final polymer regardless of the severity of washing. The presence of even trace amounts of this compound is detrimental to some of the physical properties of polymer such as clarity, heat stability and color.

It has now been discovered that colloidal silica alone can be utilized as a suspending agent in styrene polymerization if the silica is first dispersed in the monomer prior to the addition of monomer to the aqueous phase. This method provides a satisfactory suspension without the need for surface active agents and, consequently, the resultant polymer is free of this type of contamination.

Therefore, it is an object of this invention to provide a new method for the polymerization of styrene.

It is critical to the practice of this invention that the silica be first dispersed into the styrene prior to addition of the styrene to the aqueous phase. This dispersion can be accomplished by adding the silica to the monomer with agitation.

The colloidal silica which can be utilized in this invention has a particle size ranging from 0.01 micron to 0.05 micron. Preferably, it ranges from 0.015 micron to 0.05 micron. It is also preferable to utilize a colloidal silica having a spherical geometry (i.e., spheres) to impart the best optical characteristics to the polymer. The amount of silica employed depends upon the polymer particle size desired and in general, ranges from 2 to 20 parts by weight per 100 parts styrene. Preferably, the loading ranges from 3 to 10 parts by weight per 100 parts styrene.

This invention can be utilized in the aqueous suspension of styrene monomer generally, and also in the suspension of styrene monomers with co-monomers such as butadiene, acrylonitrile, or methacrylate, or with polymers such as styrene-butadiene or polybutadiene rubbers. The co-monomer loadings generally range from 1 to 100 parts per 100 parts styrene and the rubber loadings range generally from 1 to 10 parts per 100 parts of styrene.

The polymer can be prepared by exposing the monomeric suspension to a polymerization environment. Generally, the suspension is heated to a temperature ranging from 40° C. to 120° C. for a time ranging from 2 to 48 hours. Preferably, a free radical catalyst such as benzoyl peroxide, lauryl peroxide, tertiary butyl peroxide or azobisisobutylronitrile is employed to initiate and maintain polymerization. The environment should include an inert atmosphere such as nitrogen or helium. Various polymerization aids such as chain terminators, stabilizers, lubricants and additional suspending agents can be added to the polymerization if desired. Furthermore, the polymerization can be carried out either continuously or batchwise with the monomer or catalyst being added incrementally or in total at the beginning. After polymerization is completed, the polymer beads are separated from the water, washed and dried.

The following examples are given as illustrations of specific embodiments of this invention and should not be construed as limitations on the scope of invention. Throughout the specification and claims all parts are by weight.

EXAMPLE I 4.0 parts of rubber were dissolved in 96.0 parts of styrene. The rubber was a styrene-butadiene copolymer having a bound styrene content of 23.5 percent and a Mooney viscosity at 212° F. (ML-4) of 52. Benzoyl peroxide and silica were added and this mixture was then suspended in 200 parts of water containing potassium persulfate. Polymerization was conducted by raising the temperature to 93° C. under a nitrogen atmosphere for 18 hours. The polymer was then isolated by filtration, washed with water and then isopropanol and dried in a vacuum oven.

TABLE I

| Polymerization No. | 1 | 2 | 3 |
|---|---|---|---|
| Parts by weight: | | | |
| Silica [1] | 3.0 | 6.0 | 10.0 |
| Benzoyl peroxide | 0.3 | 0.5 | 0.5 |
| Potassium persulfate | 0.008 | 0.015 | 0.015 |
| Product analysis: | | | |
| Percent conversion | 85.6 | 88.5 | 86.5 |
| Particle size range | ←350–600 microns→ | | |

[1] A colloidal silica having a spherical geometry and an average particle size of 0.015 micron.

EXAMPLE II

The following ingredients are mixed:

100.0 parts styrene
3.0 parts silica having a spherical geometry and an average particle size of 0.015 micron
0.15 part benzoyl peroxide The mixture is then added to 200 parts water agitated and heated under a nitrogen atmosphere of 90° C. for 20 hours. The resultant polymer forms as distinct beads, the majority of which are less than 500 microns in diameter.

EXAMPLE III

The following polymerizations were conducted utilizing the general procedure of Example I with the amounts specified in Table III. In addition, 0.5 part benzoyl peroxide, 0.05 part tertiary dodecyl mercaptan and 0.1 part of tris(nonyl phenyl) phosphite were added to the monomer. Potassium persulfate (0.008 part) was added to the water prior to the addition of the monomer. Polymerization was conducted at 88° C. for 20 hours.

TABLE III

| Polymerization No. | 4 | 5 | 6 | 7 | 8 |
|---|---|---|---|---|---|
| Parts by weight: | | | | | |
| Styrene | 96 | 96 | 96 | 92 | 92 |
| Rubber [1] | 4 | 4 | 4 | 8 | 8 |
| Silica [2] | 0 | 4 | 4 | 0 | 4 |
| Tri calcium phosphate | 2 | 0 | 0 | 10 | 0 |
| Stearic acid | 0 | 0 | 0.5 | 0 | 0 |
| Water | 100 | 200 | 200 | 200 | 200 |
| Particle size, microns | 450–1,500 | 350–800 | ~500 | DNS [3] | ~440 |

[1] and [2] as defined in Example I.
[3] Did not suspend.

I claim:

1. A method for polymerizing styrene comprising the steps of:
   (a) dispersing from 2 to 20 parts weight of a colloidal silica having an average particle size ranging from 0.01 to 0.05 micron in a monomer system consisting essentially of 100 parts by weight of styrene and from 1 to 10 parts by weight of a styrene/butadiene copolymer having a major amount of butadiene
   (b) suspending the silica/monomer mixture in water, said silica being the sole suspending agent for the mixture.
   (c) polymerizing the aqueous suspension at a temperature range from 40 to 120° C. for a period of time ranging from 2 to 48 hours and
   (d) separating the polymer from the aqueous suspension.

2. A method according to claim 1 wherein the particle size ranges from 0.015 micron to 0.05 micron.

3. A method according to claim 1 wherein the amount of colloidal silica ranges from 3 to 10 parts per 100 parts of styrene.

References Cited

UNITED STATES PATENTS

| 2,769,788 | 11/1956 | Craven et al. | |
| 3,100,763 | 8/1963 | Meek et al. | 260—880 |

FOREIGN PATENTS

| 870,945 | 6/1961 | Great Britain. |
| 952,351 | 5/1960 | Great Britain. |

JAMES A. SEIDLECK, Primary Examiner

U.S. Cl. X.R.

260—83.7, 85.5, 86.7, 93.5